(12) United States Patent
Rohland et al.

(10) Patent No.: US 8,190,780 B2
(45) Date of Patent: May 29, 2012

(54) CLUSTER ARCHITECTURE HAVING A STAR TOPOLOGY WITH CENTRALIZED SERVICES

(75) Inventors: Hans-Christoph Rohland, St. Leon (DE); Frank Kilian, Mannheim (DE)

(73) Assignee: SAP AG, Walldorf (DE)

(*) Notice: Subject to any disclaimer, the term of this patent is extended or adjusted under 35 U.S.C. 154(b) by 1320 days.

(21) Appl. No.: 10/750,002

(22) Filed: Dec. 30, 2003

(65) Prior Publication Data
US 2005/0188021 A1    Aug. 25, 2005

(51) Int. Cl.
*G06F 15/16* (2006.01)
(52) U.S. Cl. .................................. 709/252; 709/206
(58) Field of Classification Search ................. 709/206, 709/252
See application file for complete search history.

(56) References Cited

U.S. PATENT DOCUMENTS

| | | | |
|---|---|---|---|
| 4,939,724 A * | 7/1990 | Ebersole ................ | 370/407 |
| 5,263,155 A | 11/1993 | Chung | |
| 5,301,337 A | 4/1994 | Wells et al. | |
| 5,553,239 A | 9/1996 | Heath et al. | |
| 5,613,139 A | 3/1997 | Brady | |
| 5,778,356 A | 7/1998 | Heiny | |
| 5,991,893 A | 11/1999 | Snider | |
| 6,003,075 A | 12/1999 | Arendt et al. | |
| 6,014,669 A | 1/2000 | Slaughter et al. | |
| 6,081,807 A * | 6/2000 | Story et al. ................ | 707/101 |
| 6,088,516 A | 7/2000 | Kreisel et al. | |
| 6,151,649 A | 11/2000 | Liong et al. | |
| 6,182,186 B1 | 1/2001 | Daynes | |
| 6,212,610 B1 | 4/2001 | Weber et al. | |
| 6,216,237 B1 | 4/2001 | Klemm et al. | |
| 6,253,273 B1 | 6/2001 | Blumenau | |
| 6,263,456 B1 | 7/2001 | Boxall et al. | |
| 6,300,948 B1 | 10/2001 | Geller et al. | |
| 6,363,411 B1 | 3/2002 | Dugan et al. | |
| 6,366,915 B1 | 4/2002 | Rubert et al. | |
| 6,377,950 B1 | 4/2002 | Peters et al. | |
| 6,438,560 B1 | 8/2002 | Loen | |
| 6,438,705 B1 | 8/2002 | Chao et al. | |
| 6,484,177 B1 | 11/2002 | Van Huben et al. | |
| 6,490,625 B1 | 12/2002 | Islam et al. | |
| 6,501,491 B1 | 12/2002 | Brown et al. | |
| 6,523,035 B1 | 2/2003 | Fleming et al. | |
| 6,557,009 B1 | 4/2003 | Singer et al. | |

(Continued)

OTHER PUBLICATIONS

Oetiker, Tobias "SEPP Software Installation and Sharing System", *Proceedings of the Twelfth Systems Administration Conference (LISA '98)*, Boston, Massachusetts,(Dec. 6-11, 1998),pp. 253-260.
*BEA WebLogic Server Creating and Configuring WebLogic Server Domains*, (Sep. 4, 2002).

(Continued)

*Primary Examiner* — Jeffrey Pwu
*Assistant Examiner* — Farhad Ali
(74) *Attorney, Agent, or Firm* — Schwegman, Lundberg & woessner, P.A.

(57) ABSTRACT

A cluster of architecture having a star topology with the central services node at its center. Application server instances are organized in a star topology with the central services node at its center. The central services node may include services such as a messaging server for interinstance cluster communications. A locking server may also be provided to provide clusterwide locking to facilitate changes and updates within the cluster. A database may also be shared by all instances in the cluster, thereby reducing the need for data replication. In one embodiment, the message server has no persistent state. In such an embodiment, if the message server fails, it can merely be restarted without any state recovery requirement.

26 Claims, 5 Drawing Sheets

U.S. PATENT DOCUMENTS

| | | |
|---|---|---|
| 6,564,261 B1 | 5/2003 | Gudjonsson et al. |
| 6,594,779 B1 | 7/2003 | Chandra et al. |
| 6,604,209 B1 | 8/2003 | Grucci et al. |
| 6,622,155 B1 | 9/2003 | Haddon et al. |
| 6,647,301 B1 | 11/2003 | Sederlund et al. |
| 6,654,914 B1 | 11/2003 | Kaffine et al. |
| 6,658,018 B1 | 12/2003 | Tran et al. |
| 6,678,358 B2 | 1/2004 | Langsenkamp et al. |
| 6,823,358 B1 | 11/2004 | Spender |
| 6,886,035 B2 | 4/2005 | Wolff |
| 6,892,231 B2 | 5/2005 | Jager et al. |
| 6,904,544 B2 | 6/2005 | DeRolf et al. |
| 6,934,768 B1 | 8/2005 | Block et al. |
| 6,944,829 B2 | 9/2005 | Dando |
| 6,950,874 B2 | 9/2005 | Chang et al. |
| 6,954,757 B2 * | 10/2005 | Zargham et al. ............. 707/101 |
| 6,973,473 B1 | 12/2005 | Novaes et al. |
| 6,983,324 B1 | 1/2006 | Block et al. |
| 7,047,497 B2 | 5/2006 | Patrizio et al. |
| 7,051,316 B2 | 5/2006 | Charisius et al. |
| 7,058,601 B1 | 6/2006 | Paiz |
| 7,072,934 B2 | 7/2006 | Helgeson et al. |
| 7,080,060 B2 | 7/2006 | Sorrentino et al. |
| 7,093,247 B2 | 8/2006 | Ashworth et al. |
| 7,114,170 B2 | 9/2006 | Harris et al. |
| 7,127,472 B1 | 10/2006 | Enokida et al. |
| 7,155,466 B2 | 12/2006 | Rodriguez et al. |
| 7,165,189 B1 | 1/2007 | Lakkapragada et al. |
| 7,181,731 B2 | 2/2007 | Pace et al. |
| 7,185,071 B2 | 2/2007 | Berg et al. |
| 7,197,533 B2 * | 3/2007 | Vincent et al. ............... 709/203 |
| 7,203,700 B1 * | 4/2007 | Kumar et al. ............ 707/103 R |
| 7,206,805 B1 | 4/2007 | McLaughlin, Jr. |
| 7,209,918 B2 | 4/2007 | Li |
| 7,216,257 B2 | 5/2007 | Kilian |
| 7,228,369 B2 | 6/2007 | Nakamura |
| 7,251,662 B2 | 7/2007 | Behman et al. |
| 7,302,609 B2 | 11/2007 | Matena et al. |
| 7,316,016 B2 | 1/2008 | DiFalco |
| 2001/0023440 A1 | 9/2001 | Franklin et al. |
| 2001/0049726 A1 | 12/2001 | Comeau et al. |
| 2002/0029334 A1 | 3/2002 | West et al. |
| 2002/0069272 A1 | 6/2002 | Kim et al. |
| 2002/0069378 A1 | 6/2002 | McLellan et al. |
| 2002/0078132 A1 * | 6/2002 | Cullen et al. .................. 709/201 |
| 2002/0078213 A1 | 6/2002 | Chang et al. |
| 2002/0091969 A1 | 7/2002 | Chen et al. |
| 2002/0120717 A1 | 8/2002 | Giotta et al. |
| 2002/0124082 A1 | 9/2002 | San Andres et al. |
| 2002/0161750 A1 | 10/2002 | Rajarajan et al. |
| 2002/0161870 A1 | 10/2002 | French et al. |
| 2002/0165727 A1 * | 11/2002 | Greene et al. ..................... 705/1 |
| 2003/0014552 A1 | 1/2003 | Vaitheeswaran et al. |
| 2003/0018887 A1 | 1/2003 | Fishman et al. |
| 2003/0037148 A1 | 2/2003 | Pedersen |
| 2003/0051195 A1 | 3/2003 | Bosa et al. |
| 2003/0093420 A1 | 5/2003 | Ramme |
| 2003/0120760 A1 | 6/2003 | Fortin et al. |
| 2003/0126136 A1 | 7/2003 | Omoigui |
| 2003/0154239 A1 * | 8/2003 | Davis et al. .................. 709/201 |
| 2003/0167298 A1 | 9/2003 | Bazinet et al. |
| 2003/0167331 A1 | 9/2003 | Kumar et al. |
| 2003/0187991 A1 | 10/2003 | Lin et al. |
| 2003/0200321 A1 | 10/2003 | Chen et al. |
| 2003/0204552 A1 | 10/2003 | Zuberi |
| 2003/0217092 A1 | 11/2003 | Veselov |
| 2003/0236923 A1 * | 12/2003 | Jeyaraman et al. ........... 709/318 |
| 2003/0236925 A1 | 12/2003 | Balek et al. |
| 2004/0006614 A1 | 1/2004 | DiFalco |
| 2004/0010502 A1 | 1/2004 | Bomfim et al. |
| 2004/0015968 A1 | 1/2004 | Neiman et al. |
| 2004/0019639 A1 | 1/2004 | E et al. |
| 2004/0019662 A1 | 1/2004 | Viswanath et al. |
| 2004/0073782 A1 | 4/2004 | Price et al. |
| 2004/0128370 A1 | 7/2004 | Kortright |
| 2004/0146056 A1 | 7/2004 | Martin et al. |
| 2004/0148183 A1 | 7/2004 | Sadiq |
| 2004/0148369 A1 | 7/2004 | Strassner |
| 2004/0153558 A1 | 8/2004 | Gunduc et al. |
| 2004/0153639 A1 | 8/2004 | Cherian et al. |
| 2004/0249904 A1 | 12/2004 | Moore et al. |
| 2004/0249918 A1 | 12/2004 | Sunshine |
| 2004/0254584 A1 | 12/2004 | Sarin et al. |
| 2004/0260748 A1 | 12/2004 | Springer et al. |
| 2004/0260773 A1 | 12/2004 | Springer |
| 2005/0005200 A1 | 1/2005 | Matena et al. |
| 2005/0015471 A1 | 1/2005 | Zhang et al. |
| 2005/0055686 A1 | 3/2005 | Buban et al. |
| 2005/0108395 A1 | 5/2005 | Brey et al. |
| 2005/0114315 A1 | 5/2005 | Tanner et al. |
| 2005/0144507 A1 | 6/2005 | Lee et al. |
| 2005/0251500 A1 | 11/2005 | Vahalia et al. |
| 2005/0268294 A1 | 12/2005 | Petev et al. |
| 2006/0001262 A1 | 1/2006 | Bormioli |
| 2006/0010438 A1 | 1/2006 | Brady, Jr. et al. |
| 2006/0053330 A1 | 3/2006 | Pomaranski et al. |
| 2006/0106590 A1 | 5/2006 | Tseng et al. |
| 2009/0019139 A1 | 1/2009 | Strassner |

OTHER PUBLICATIONS

"Server Clusters: Architecture Overview for Windows Server 2003", *Microsoft Windows Server 2003*, (Mar. 2003).

Oetiker, Tobias, "SEPP Software Installation and Sharing System", *Proceedings of the Twelfth Systems Administration Conference (LISA '98)*, Boston, Massachusetts, (Dec. 6-11, 1998), pp. 253-260.

Heik, Stephan, et al., Non-Final Office Action dated Oct. 12, 2007, U.S. Appl. No. 10/756,021, filed Jan. 12, 2004, 29 pgs.

Heik, Stephan, Final Office Action dated Mar. 26, 2008, U.S. Appl. No. 10/756,021, filed Jan. 12, 2004, 18 pgs.

Heik, Stephan, Non-Final Office Action dated Aug. 14, 2008, U.S. Appl. No. 10/756,021, filed Jan. 12, 2004, 19 pgs.

Nitzberg, et al., "Distributed Shared Memory: A Servey of Issues and Algorithims", IEEE, (1999), pp. 52-60.

Sohda, et al., "Implementation of a Portable Software DSM in Java," ACM, (2001), pp. 163-172.3.

"Office Action for U.S. Appl. No. 10/749,851", mailed Oct. 15, 2008, Whole document.

Nuno, Preguica, et al., "Data Management Support for Asynchronous Groupware", *ACM*, (2000), pp. 69-78.

Non-Final Office Action for U.S. Appl. No. 10/750,280, Mailed Dec. 23, 2008, 18 pages.

Non-Final Office Action dated Sep. 12, 2007, U.S. Appl. No. 10/750,043, filed Dec. 30, 2003, whole document.

Final Office Action dated Nov. 16, 2007, U.S. Appl. No. 10/750,003, filed Dec. 30, 2003, whole document.

Non-Final Office Action dated Jul. 21, 2008, U.S. Appl. No. 10/750,003, filed Dec. 30, 2003, whole document.

Non-Final Office Action dated Oct. 27, 2008, U.S. Appl. No. 10/749,957, filed Dec. 30, 2003, whole document.

Non-Final Office Action dated Jan. 25, 2008, U.S. Appl. No. 10/749,957, filed Dec. 30, 2003, whole document.

Final Office Action dated Jul. 10, 2008, U.S. Appl. No. 10/749,957, filed Dec. 30, 2003, whole document.

Non-Final Office Action dated Jun. 10, 2008, U.S. Appl. No. 10/749,623, filed Dec. 30, 2003, whole document.

Final Office Acion dated Nov. 26, 2007, U.S. Appl. No. 10/749,623, filed Dec. 30, 2003, whole document.

Notice of Allowance for U.S. Appl. No. 10/749,851, Mailed Jan. 27, 2009, 10 pages.

Notice of Allowance for U.S. Appl. No. 10/749,957, Mailed Jan. 30, 2009, 9 pages.

Non-Final Office Action for U.S. Appl. No. 10/756,021, mailed Feb. 27, 2009, 22 pages.

Notice of Allowance for U.S. Appl. No. 10/750,280, Mailed Apr. 13, 2009, 30 pages.

Davis, Peter, "Securing and controlling CISCO Routers", CRC Press LLC, (2002), 1-29.

Haase, Kim, "JAVA Message Service API Tutorial", *Sun Microsystems, Inc.*, 2002, pp. 1-278.

Tudor, Jan K., "Information Security Architecture—An Integrated Approach to Security in the Organization", CRC Press LLC, (2001), 1-12.

* cited by examiner

CLUSTER ARCHITECTURE HAVING A STAR TOPOLOGY WITH CENTRALIZED SERVICES

BACKGROUND

1. Field of the Invention

The invention relates to cluster architecture. More specifically, the invention relates to a star topology cluster architecture for application servers.

2. Background

Traditionally, each instance in a cluster of application servers maintains a direct communication link with each other instance. In the cluster, as used herein, instance refers to a unit in the cluster, which can be started, stopped, and monitored separately from other units in the cluster. As the cluster becomes increasingly large, the overhead associated with maintaining the communication link from each instance to every other instance becomes quite burdensome. Resulting performance problems have created a real constraint on cluster size. Additionally, to maintain the homogeneity of the cluster, large amounts of data are replicated and passed around the cluster over these myriad communication links. This overhead severely impacts the scalability of such cluster architectures.

SUMMARY

A cluster of architecture having a star topology with a central services node at its center is described. Application server instances are organized in the star topology with the central services node at its center. The central services node may include services such as a messaging server for interinstance cluster communications. A locking server may also be provided to provide cluster wide locking to facilitate changes and updates of data within the cluster or to synchronize concurrent processes. A database may also be shared by all instances in the cluster, thereby reducing the need for data replication. In one embodiment, the message server has no persistent state. In such an embodiment, if the message server fails, it can merely be restarted without any state recovery requirement.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
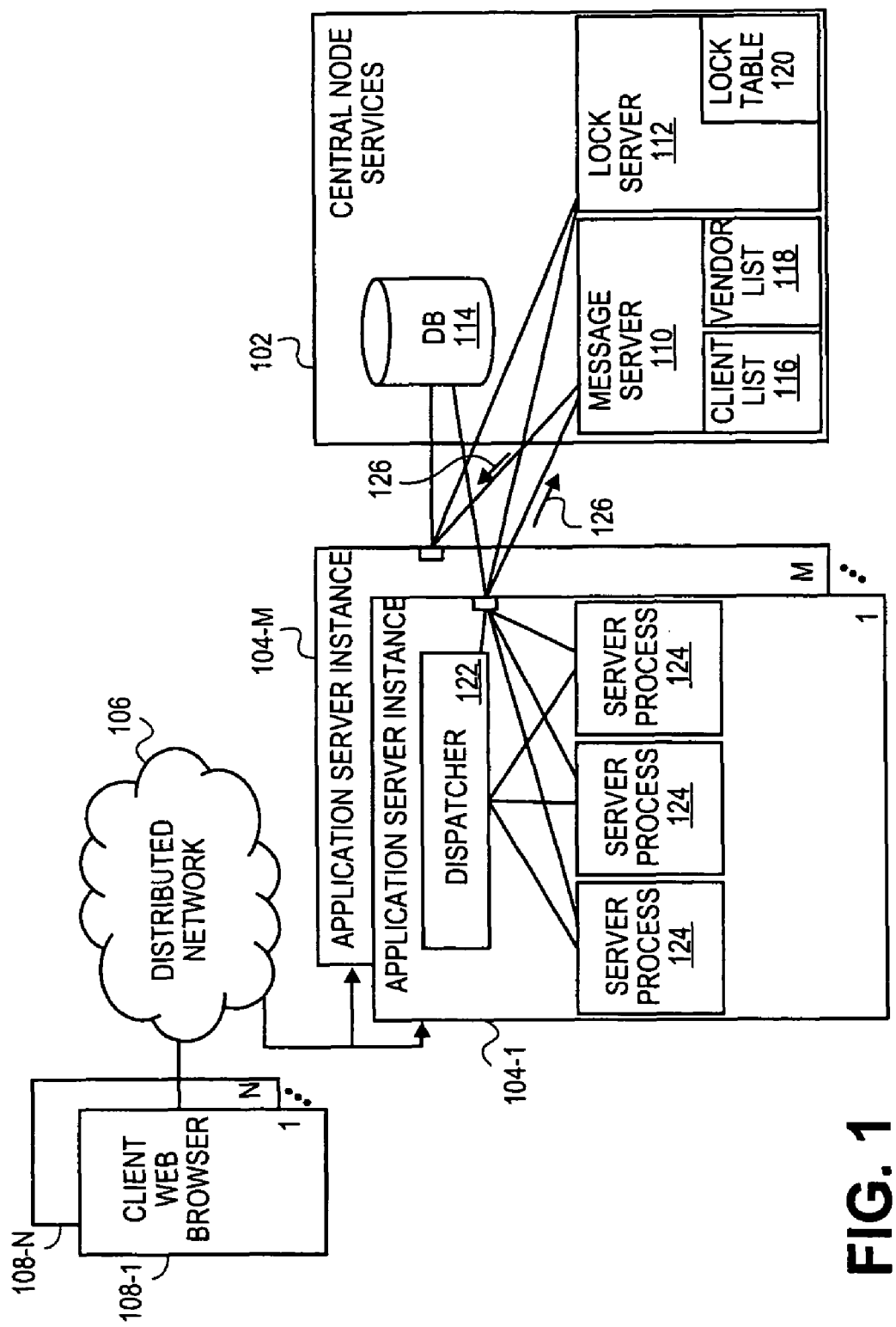
FIG. 1 is a block diagram of a system employing a cluster architecture of one embodiment of the invention.

FIG. 1 is a block diagram of a system employing a cluster architecture of one embodiment of the invention. A cluster includes central services node 102 which is organized in star topology with one or more application server instances 104 (104-1 to 104-M) with the central services node 102 at the center of the star topology. Application server instances 104 received requests from one or more clients for example, via web browsers 108 (108-1 to 108-N) over a distributed network 106. In one embodiment, the network 106 may be a distributed network such as the Internet. In one embodiment, requests from the client web browser 108 may be transmitted using hypertext transfer protocol (HTTP). In one embodiment, the cluster is a Java 2 enterprise edition (J2EE) cluster.

As previously noted, as used herein, each "instance" is a unit in the cluster, which can be started, stopped and monitored separately. In one embodiment, each instance runs on a physical server, but more than one instance may run on a single physical server. In one embodiment, an instance may be identified within the cluster by a system identification number and an instance number. In one embodiment, the central services node is an example of a J2EE instance.

An instance typically contains at least one server process 124. More commonly, an instance includes a dispatcher 122 and several server processes 124. The dispatcher 122 and the server process 124 are described in greater detail below in connection with FIG. 2. It is also contemplated that more than one dispatcher may reside in a single instance.

In one embodiment, central services node 102 includes a message server 110, lock server 112 and a shared database 114. The message server 110 maintains a client list 116. The client list 116 includes a listing of the dispatchers 122 and server processes 124 of the cluster. Client list 116 should not be confused with a list of client web browsers 108, but rather, is a list of the clients of the message server. The message server also maintains a service list 118, which lists the services available within the cluster such as, for example, an HTTP service.

Message server 110 is responsible for interinstance communication. For example, if a server process 124 of instance 104-1 wishes to send a message 126 to instance 104-M, a message 126 is sent via the message server 110 which provides the infrastructure for interinstance communication. In one embodiment, each server process 124 and each dispatcher 122 has a link through which it can communicate with the message server, and through which the message server may send messages notifying of events within the cluster. Message server 110 also supplies a dispatcher 122 with information to facilitate load balancing between various instances in the cluster. As noted above, the message server 110 also provides notification of events that arise within a cluster, for example, failure or shutdown of an instance or when a service is started or stopped. Because the message server may represent a single point of failure in the cluster, it should support failover to be effectively used in high availability systems. To that end, in one embodiment, the message server has no persistent state such that if the message server fails, it need merely be restarted and then re-register instances in the cluster without performing any state recovery procedures.

Lock server 112 is used for internal synchronization of the cluster. Applications may lock objects and then release the objects subsequently. This is particularly true in the context of updating the cluster, with for example, deployment of a new application. Lock server 112 maintains a lock table 120 in which it manages logical database locks to prevent inconsistent modifications of, for example, database 114. In one embodiment, the lock table is maintained in main memory (not shown). In one embodiment, lock table 120 maps logical locks to data that is contained in database 114. The lock sever 112 may also represent a single point of failure within the cluster. For high availability systems, a replication server may be provided which maintains a real time replica of the state of the lock server 112. After lock server failure, the lock server 112 may be restarted with the replication of the state from the replication server.

Figure 2:
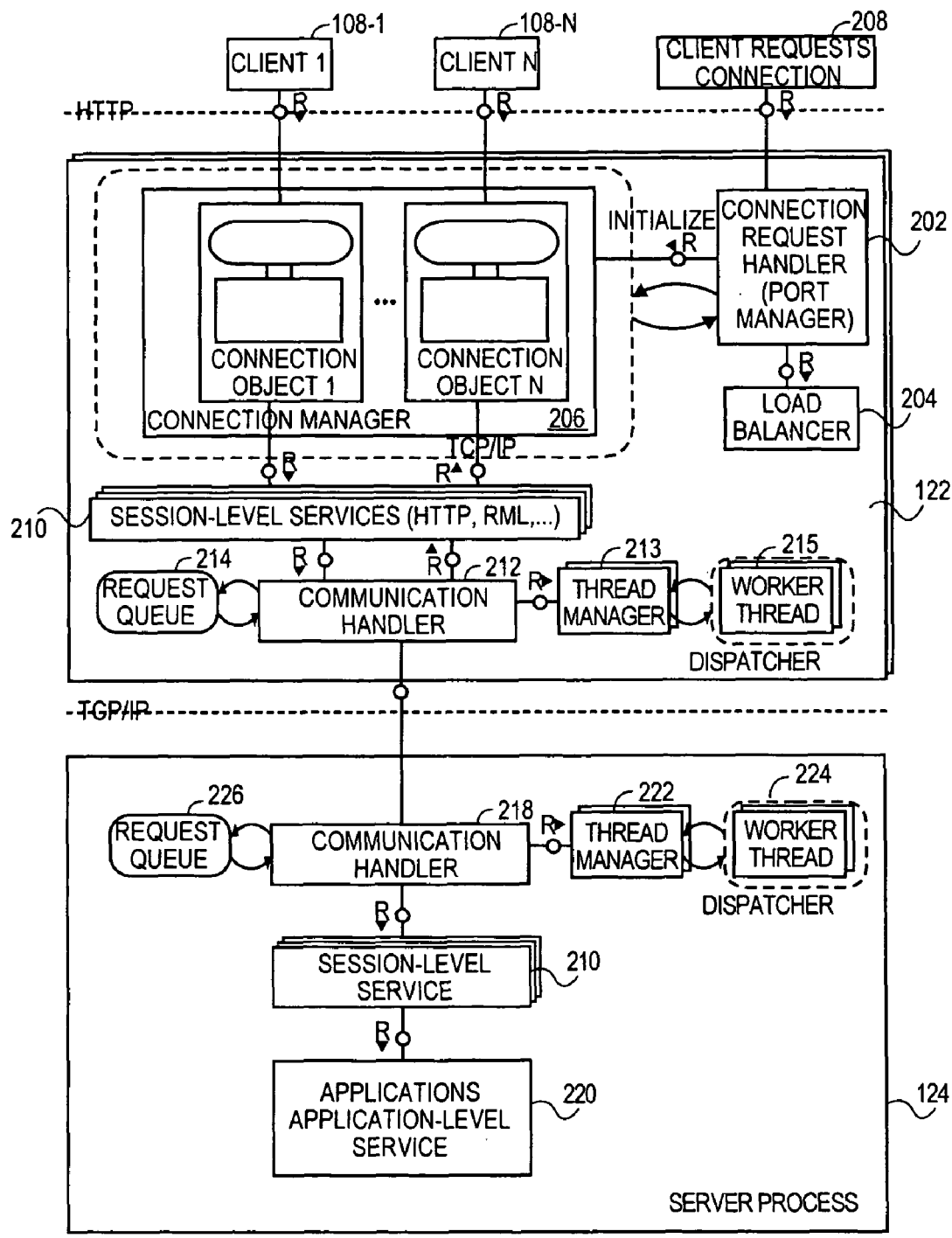
FIG. 2 is a fundamental modeling concept (FMC) diagram of dispatcher/server process interaction.

FIG. 2 is a fundamental modeling concept (FMC) diagram of dispatcher/server process interaction. Initially, the client 208 requests connection from the connection request handler 202 using, for example, HTTP. A load balancer 204 provides an indication of which server process 124 is going to handle the client response request from the connection request handler 202. In one embodiment, load balancer 204 uses a weighted round robin procedure. The connection request handler 202 initializes a connection object, which is then assigned to the client 208 after which the client will have connection to the connection manager 206 going forward. Client 108-1 and 108-M are shown with connections to connection manager 206 already in place. Once the connection request handling 202 creates the connection object and establishes the connection, connection manager 206 identifies what session level services 210, such as HTTP or RMI (remote method in location) for example, will be used. All requests from the same client are sent to the same server process 124 thereafter. The connection manager 206 then forwards the request including the session level services to the communication handler 212 where they may be queued in request queue 214 until thread manager 213 provides a worker thread 215 to service the requests to be sent to the server process 124.

Request to the server process 124 in one embodiment, may be sent using transmission control protocol/internet protocol (TCP/IP). Communications handler 218 in the server process receives the request from the dispatcher 122 and queues it in the request queue 226 until thread manager 222 provides a worker thread 224 to service the request. Session level services 210, which may be the same as those assigned in the dispatcher node 122, are applied and the thread attempts to service the request using the application/application level service 220. Because each server processes is multi-threaded, a large number of requests may be serviced simultaneously. The response to the request is sent back through the dispatcher 122 over the connection established within the connection manager 206 to the client 108.

Figure 3:
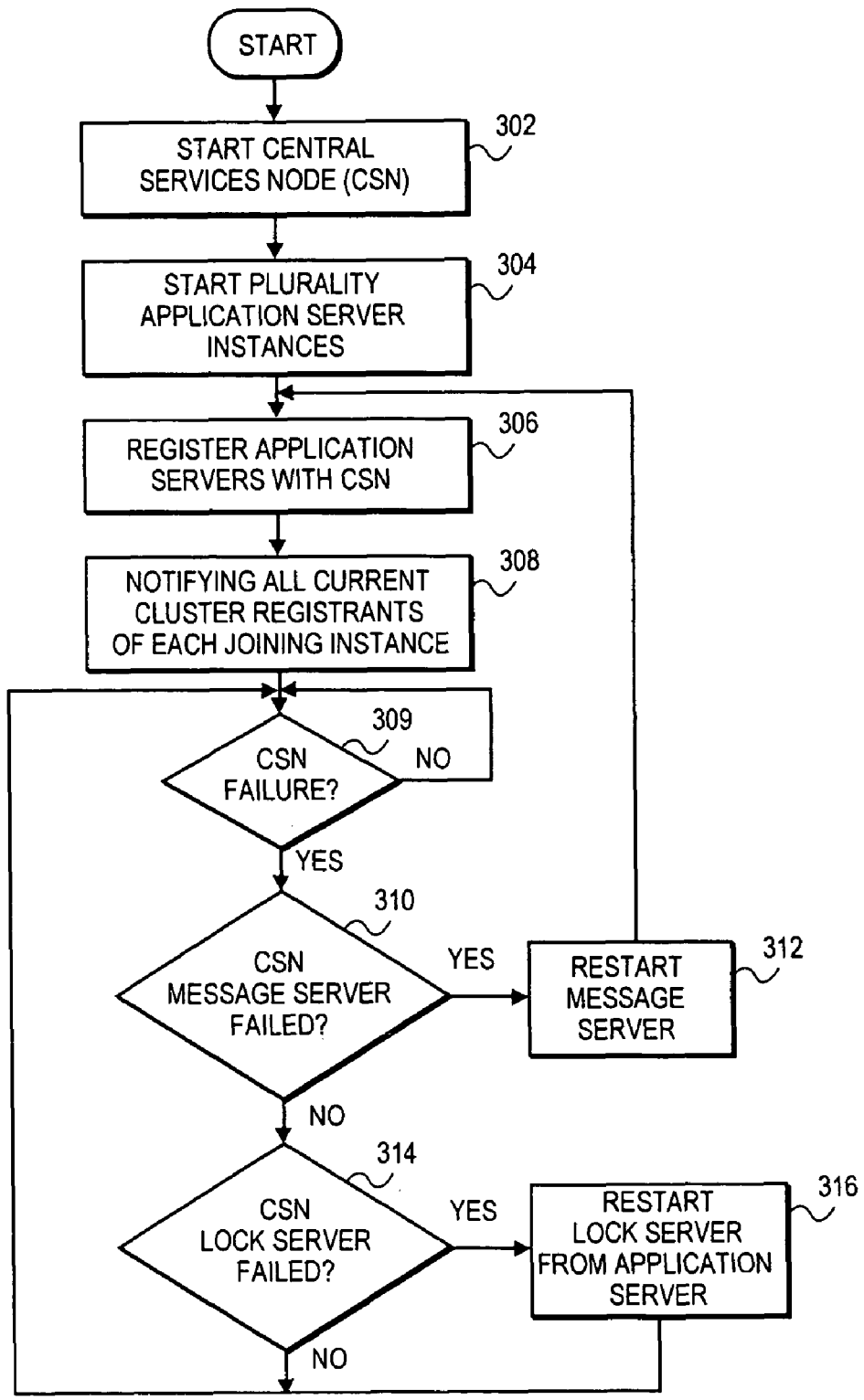
FIG. 3 is a flow diagram of a cluster establishment in one embodiment of the invention.

FIG. 3 is a flow diagram of a cluster establishment in one embodiment of the invention. At block 302, the central services node (CSN) is started. In one embodiment, the central services are provided by the central services node started on a physical server with its own system number and the system identification number of the whole system. Once the central services node is up and running, additional instances are started at block 304. One manner in which additional instances may be started is described with reference to FIGS. 4 and 5 below. The dispatcher and server processes of the various instances register with the central services node at block 306. In one embodiment, a message server in the central services node maintains a list of connected clients including a system ID and instance number for each dispatcher and server process running in the cluster. At block 308, the central services node notifies all current cluster registrants as each additional instance joins the cluster. This may include notifying the cluster constituents of services available within the cluster start up, including any new services deployed as a result of additional instances during a cluster or additional application deployment.

A determination is made at decision block 309 if a failure has occurred in the central services node. Failure may be the result of, for example, the message server failing, lock server failure or database failure. If a failure has occurred, a determination is made at block 310 if the database has failed. If it has, the database is recovered according to procedures established by the database vendor at block 312. If the database has not failed, or after recovery, a determination is made at decision block 314, if the central services node lock server has failed. If it has, lock server is restarted using a replica from the replication server at block 316. A determination is then made at decision block 318 when the message server has failed. If the message server has failed, the message server is restarted at block 420. Once the message server has restarted, registration of the instances can recommence at block 306 as previously described. If the central services node has not failed, failure is awaited at block 309. While FIG. 3 depicts a flow diagram, in various embodiments certain operations may be conducted in parallel or in a different order than depicted. Accordingly, different ordering and parallelism are within the scope of the invention.

Figure 4:
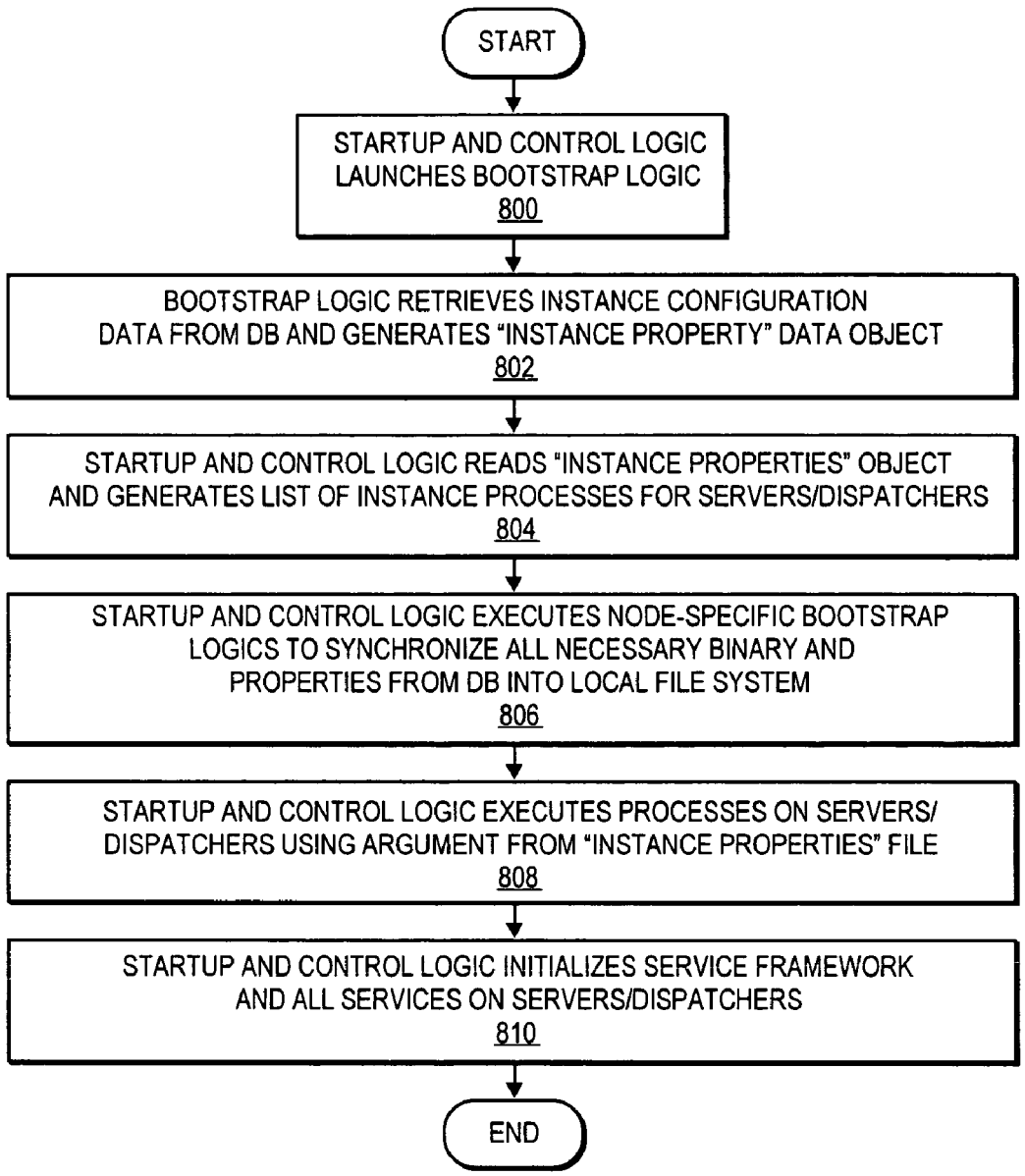
FIGS. 4 and 5 illustrate one exemplary startup method and framework, respectively.
Figure 5:
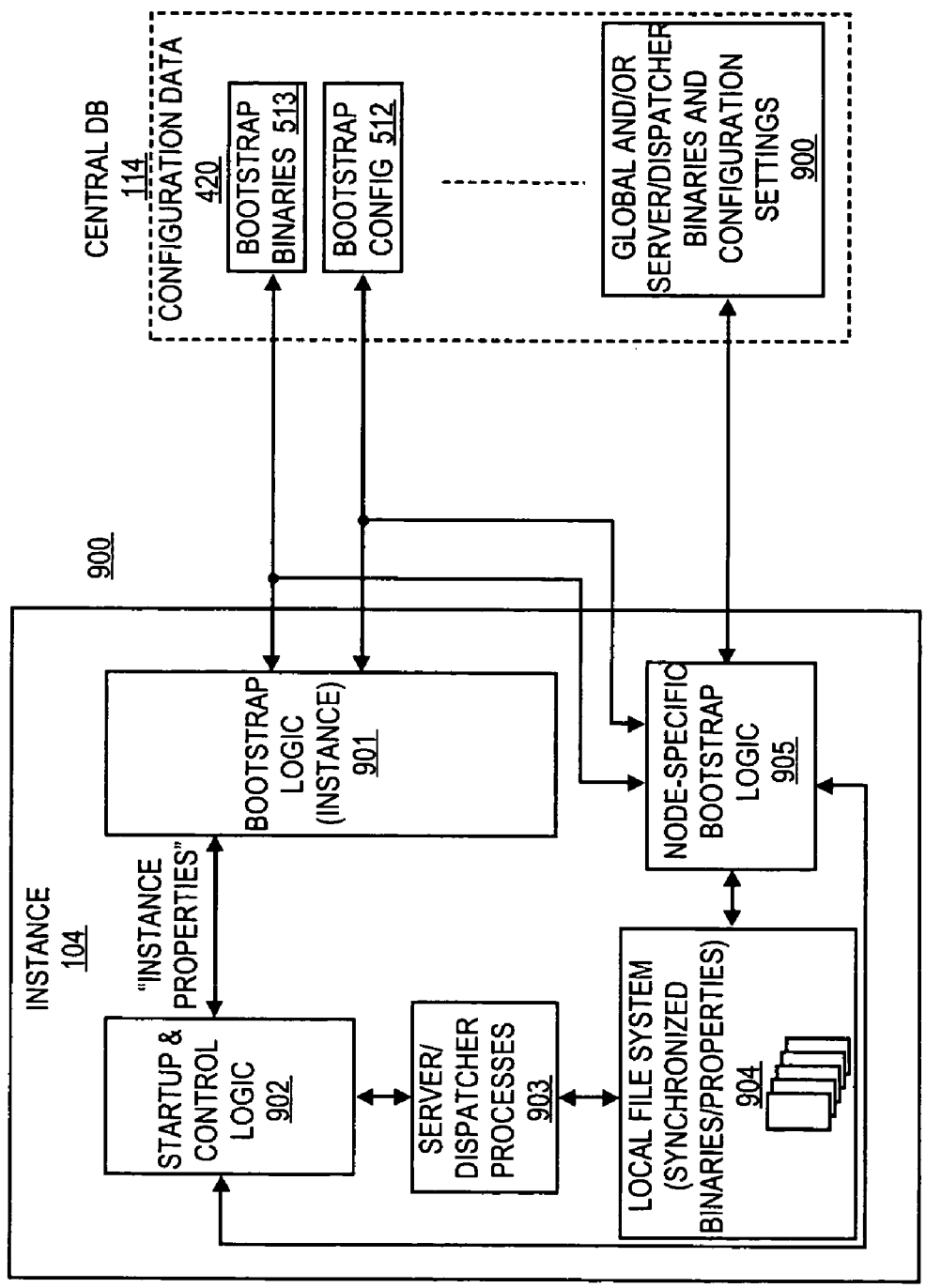

One embodiment of the invention employs a unique startup framework for starting and stopping the various server instances within the cluster. FIGS. 4 and 5 illustrate one exemplary startup method and framework, respectively. The startup framework 900 includes startup and control logic 902 and bootstrap logic 901. In one embodiment, the startup and control logic 902 provides the central point of control for the instance 104 and for all processes 903 executed within the servers and dispatchers of the instance 104. For example, the instance startup procedure described herein is performed under the control of the startup and control logic 902.

Turning to the method in FIG. 4, at 800, the startup and control program 902 launches the bootstrap logic 901 to initiate startup of the instance (e.g., in response to a startup command entered by a network administrator). As illustrated in FIG. 5, the bootstrap logic 901 is comprised of bootstrap binaries 513 and is configured based on bootstrap configuration parameters 512 stored within the configuration data hierarchy 420 of the central database 114. Thus, if necessary, the bootstrap logic 901 may be modified/updated at a single, central location and subsequently distributed to servers/instances upon request.

At 802, the bootstrap logic retrieves up-to-date configuration data 420 from the central database 114 including the layout of the instance 104 (e.g., identifying the servers and dispatchers to be started) and the parameters/arguments to be used for each server and dispatcher within the instance 104. In one embodiment, the bootstrap logic 901 uses this information to construct a description of the instance, which it provides to the startup and control logic 902 in the form of an "Instance Properties" data object. In one embodiment, the Instance Properties data object is simply a text file containing a list of servers/dispatchers and associated parameters which the startup and control logic parses to determine the instance layout and settings. However, various alternate data formats may be employed for the Instance Properties file while still complying with the underlying principles of the invention (e.g., such as the "Extensible Markup Language" or "XML" format).

At 804, using the instance layout and configuration data from the Instance Properties data object, the startup and control logic 902 builds a list of servers and/or dispatchers to be started, including an indication of the specific instance processes to be started on each server/dispatcher. In one embodiment of the invention, prior to starting each server/dispatcher identified in the list, the startup and control logic 902 launches node-specific bootstrap logic 905, at 806, to synchronize the binaries and configuration settings on each server and/or dispatcher. For example, if the instance 104 was inoperative for a period of time, the global and/or server/dispatcher-specific binaries and configuration settings 900 may have changed within the central database 114. Accordingly, in one embodiment, when the node-specific bootstrap logic 905 is launched, it compares the binaries and configuration settings stored in the local file system of the server/dispatcher being started to the binaries and configuration settings 900 stored in the central database 114. In one embodiment, the comparison is performed between an index of the data stored locally on the server/dispatcher and an index of the data stored within the central database 420 (e.g., an index built from the hierarchical structure illustrated in FIG. 5).

Regardless of how the comparison is performed, if the binaries and/or configuration settings stored within the local file system 904 of the dispatcher/server are out-of-date, then the current binaries and/or configuration settings 900 are retrieved from the central database 114 and stored within the local file system 904 of the dispatcher/server. In one embodiment, only the binaries and/or configuration settings which are new are copied to the local file system 904, thereby conserving network bandwidth and server resources.

Once synchronization is complete, at 808, the startup and control logic executes the processes on each of the servers using arguments/parameters included within the Instance Properties data object. At 810, the startup and control logic initializes the service framework and services on the servers/dispatchers within the instance 104. For example, the service framework and services are the J2EE service framework and J2EE services, respectively, in a Java environment. However, various other types of services/frameworks may be employed while still complying with the underlying principles of the invention.

Embodiments of the invention may include various operations as set forth above. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific embodiments thereof. It will, however be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
   a message server that is configured to be restarted after a failure without performing state recovery operations; and
   a plurality of instances of an application server coupled in a star topology with the message server at a center of the star topology, the message server handling communications between the plurality of instances of the application server, one or more of the plurality of instances to register or reregister instance-specific information with the message server upon a starting or restarting, respectively, of the message server, the instance-specific information identifying one or more services that the one or more of the plurality of instances is configured to provide to each of the plurality of instances.

2. The system of claim 1 wherein each of the plurality of instances comprises:
   a dispatcher node; and
   a plurality of server nodes.

3. The system of claim 2 wherein each of the plurality of server nodes comprises a java 2 enterprise edition (J2EE) engine.

4. The system of claim 1 further comprising a central lock server to provide cluster wide locks to the plurality of instances.

5. The system of claim 1 wherein the message server comprises:
   a first data structure to store a list of connected clients; and
   a second data structure to store a list of services provided in the system.

6. The system of claim 1, wherein each of the plurality of instances is started using a first instance-specific bootstrap logic, the first instance-specific bootstrap logic synchronized with a second instance-specific bootstrap logic stored in the database.

7. The system of claim 1, wherein a node within the plurality of instances is started using a first node-specific bootstrap logic, the first node-specific bootstrap logic synchronized with a second node-specific bootstrap logic stored in the database.

8. The system of claim 1, wherein the plurality of instances are unable to communicate with each other during a failure of the message server.

9. A non-transitory computer readable storage media containing executable computer program instructions which when executed cause a digital processing system to perform a method comprising:
   starting a central services node to provide a locking service and a messaging service, the messaging service configured to be restarted after a failure without performing state recovery operations, the messaging service handling communications between a plurality of application server instances;
   starting the plurality of application server instances;
   organizing the application server instances into a cluster having star topology with the central services node at a center of the star topology; and
   registering or reregistering instance-specific information with the central services node upon starting or restarting, respectively, of the central services node, the registering or registering initiated by one or more of the plurality of application server instances, the instance-specific information identifying one or more services that the one or more of the plurality of application server instances are configured to provide to each of the plurality of application server instances.

10. The non-transitory computer readable storage media of claim 9, the method further comprising sharing a database among the plurality of application server instances.

11. The non-transitory computer readable storage media of 9, the method wherein starting a plurality of application server instances comprises starting, for each application server instance of the plurality, a dispatcher node and a plurality of server nodes.

12. The non-transitory computer readable storage media of claim 9, the method further comprising starting a message server having no persistent state.

13. The non-transitory computer readable storage media of claim 12, the method further comprising restarting the message server without state recovery responsive to a system failure.

14. The non-transitory computer readable storage media of claim 9, the method further comprising conducting inter instance communication through the messaging service.

15. A system comprising:
   means for organizing a plurality of application servers instances into a cluster having a star topology with a central services node at a center of the star topology;
   means for sharing a storage resource across the cluster; and
   means for performing centralized inter instances communication that is configured to be restarted after a failure without performing state recovery operations, the inter instances communication including registering or reregistering of instance-specific information with the central services node upon a starting or restarting, respectively, of the central services node, the registering or reregistering initiated by one or more of the plurality of application server instances, the instance-specific information identifying one or more services, that the one or more of the plurality of application server instances are configured to provide to each of the plurality of application server instances.

16. The system of claim 15 further comprising means for centrally locking a resource within the cluster.

17. The system of claim 15 wherein the means for performing comprises a message server having no persistent state.

18. The system of claim 15 wherein the means for performing comprises means for recording services provided in the cluster.

19. A method comprising:
   starting a central services node to provide a locking service and a messaging service, the messaging service being configured to be restarted after a failure without performing state recovery operations, the messaging service handling communications between a plurality of application server instances;
   starting the plurality of application server instances;
   organizing the plurality of application server instances into a cluster having a star topology with the central services node at a center of the star topology; and
   registering or reregistering instance-specific information with the central services node upon a starting or a restarting, respectively, of the central services node, the instance-specific information identifying one or more services the one or more of the plurality of application server instances are configured to provide to each of the plurality of application server instances.

20. The method of claim 19 further comprising sharing a database among the plurality of application server instances.

21. The method of claim 19 wherein starting a plurality of application server instances comprises starting, for each instance of the plurality, a dispatcher node and a plurality of server nodes.

22. The method of claim 19 wherein the messaging service has no persistent state.

23. The method of claim 22 further comprising restarting the message server without state recovery responsive to a system failure.

24. The method of claim 19 further comprising conducting inter instance communication through the messaging service.

25. The system of claim 19, further comprising notifying each of the plurality of application server instances of the registering or reregistering of the instance-specific information.

26. The method of claim 19, wherein the instance-specific information further includes information about a new service that the one or more of the plurality of instances provide.

* * * * *